Feb. 22, 1944.  J. C. CHENETTE  2,342,178
PORTABLE HAND TRUCK
Filed July 28, 1941   2 Sheets-Sheet 2

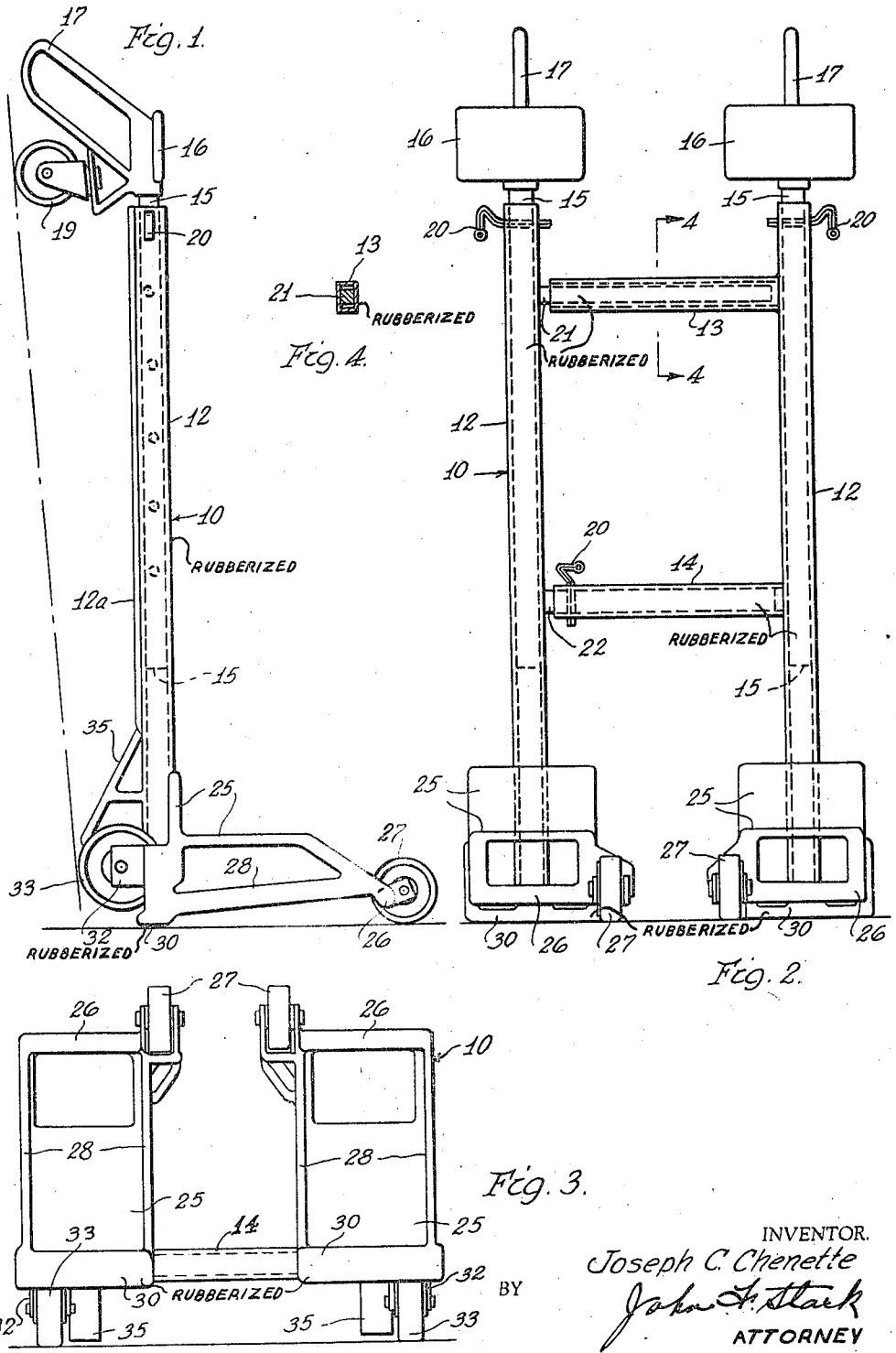

INVENTOR.
Joseph C. Chenette
BY John F. Stark
ATTORNEY

Patented Feb. 22, 1944

2,342,178

UNITED STATES PATENT OFFICE 2,342,178

PORTABLE HAND TRUCK

Joseph C. Chenette, Flat Rock, Mich.

Application July 28, 1941, Serial No. 404,316

4 Claims. (Cl. 280—34)

This invention relates to portable trucks in general, and more particularly, concerns a hand truck having a rubber sheathed frame which is extensible longitudinally and/or laterally for reception of various shape articles.

When using the conventional hand truck difficulty has been experienced in its adaptation to accommodate articles of various shapes such as refrigerators, stoves, and water heaters. If the truck was long enough to properly handle a refrigerator it was too long and narrow to conveniently receive the new broad flat cabinet type stoves, and generally unsuited for use in close quarters on stairways. Furthermore, the transportation of such home appliances as above described necessitates care that the highly finished surfaces thereof are not marred in handling, and which has heretofore been guarded against by blanketing the article, but this is a tedious time-wasting expedient and is overcome in the present instance by a truck having an envelope coating of rubber sheathed frame members which contact the article supported thereby. Accordingly, to this end, the present invention overcomes the aforementioned difficulties by providing a portable hand truck having rubber sheathed, load supporting, frame members which are extensible longitudinally and/or laterally.

Among the objects of the present invention is the provision of a portable hand truck having a frame comprising telescoping side members having caster wheels upon their lower ends and hand holds upon their upper ends, and including one or more telescoping cross members for lateral or width adjustment; the provision in a hand truck, as above described, of spaced load supporting pads adjacent each end of the telescoping side members including a second set of swivelable caster wheels adjacent the upper hand holds thereof and a pair of oval padded brake members forward of the first set of caster wheels to prevent accidental displacement of the truck when at rest in a self-standing position; the provision in a hand truck, as above described, of a second set of hand holds formed integrally with the lower set of load supporting pads, including a third set of auxiliary caster wheels journalled thereon for rolling the truck under an article to be moved when in an upright position; the provision in a hand truck, as above described, of skids or runners on the back of the frame side members angled off from adjacent the main caster wheels to prevent any sudden drop, when shifted to or from an automotive truck or loading dock, from the hand truck wheels to the truck proper.

Another object of the invention is the provision of a portable hand truck having extensible frame members with hand holds upon their upper ends backed up by caster wheels including rubber sheathed load supporting pads and including pivotal and adjustable hand grips and auxiliary caster wheels for movement of the truck in a horizontal or inclined position; the provision in a hand truck, as above described, in which is provided an improved truck construction with a reduction in the number of component parts and improved maneuverability.

Further and other objects and advantages of the invention reside in the novel combination and arrangement of parts to be hereinafter described in conjunction with the drawings forming a part of this specification and pointed out with particularity in the appended claims. This application is a continuation in part of my co-pending application Serial No. 350,694, filed August 3, 1940, now Patent Number 2,277,302, dated March 24, 1942.

In the drawings like reference characters denote corresponding parts throughout the several views, and in which:

Fig. 1 is a side elevational view of a preferred form of hand truck according to this invention; and Fig. 2 is a front elevational view of the hand truck in a vertical position; and Fig. 3 is a bottom plan view of the truck shown in Fig. 1; and Fig. 4 is a sectional view of a transverse telescoping frame member taken on the line 4—4 of Fig. 2.

Figure 5:
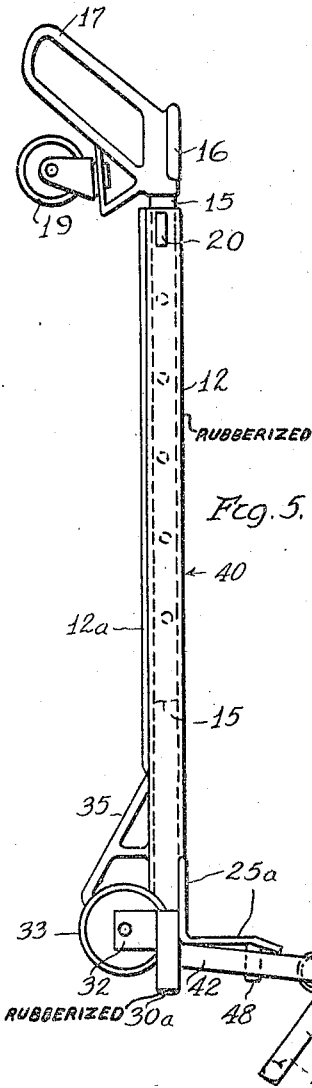
Fig. 5 is a side elevational view similar to Fig. 1 but illustrating a slightly modified form of this invention.

Now having reference to the drawings, and particularly Figs. 1 through 4, there is shown a portable hand truck, generally designated 10, having a pair of opposite side frame members 12—12, and upper and lower cross frame members 13 and 14, respectively. The side frame members 12—12 are of hollow rectangular section into the upper ends of which are telescoped extensible frame members 15 having transverse bearing pads 16 adjacent their outer ends and terminating in a pair of elongated looped hand holds 17 integral therewith and depending therefrom. In some instances it may be desirable to provide a pair of auxiliary swivelable caster wheels 19 which may be suspended from the rear face of the bearing pads and inward of the hand holds but having the lower peripheries of the caster wheels extending below the marginal edge of the hand holds thereby enabling the truck to be used as a rolling dollie. The telescoping frame members 15—15 have a series of spaced openings therethrough for reception of a split spring pin 20 which securely maintains the truck in the selected adjusted length regardless of the position in which the truck is tilted.

The cross frame members 13 and 14 likewise have telescoping sections 21 and 22, respectively, and the member 14 has a split spring pin for holding the telescoped section 22 in adjusted position. However, the telescoped section 21, of the cross frame member 13, needs no split spring pin, and, as will be noticed from Fig. 4, its vertical dimension is substantially less than its width which is just sufficient to present a sliding fit to the hollow section of the frame member 13. The reason for this is that if the two telescoping sections 21 and 22 were just sufficient to present a full sliding fit into their respective enveloping frame members it would require perfect alignment of the cross frame members where they are welded to the side frame members 12—12, in order to prevent binding when the truck is adjusted as to width or in a lateral direction. With the present construction, however, it will be apparent that the opposite frame members 12 are free to shift slightly in a longitudinal direction to compensate for mechanical inaccuracies by reason of the vertical clearance between the telescoped section 21 and its enveloping frame member 13, but the frame members are substantially prevented from twisting out of a plane passed through the longitudinal axis of the truck by reason of the close sliding fit between the telescoped frame members 13, 21 and 14, 22 in the opposite direction, thereby presenting a substantially flat surface throughout its adjustment range to an article to be carried thereby. It will be apparent now that under certain conditions it will not be necessary to provide the upper telescoping frame members 13 and 21, where a slight amount of twisting of the frame members 12—12 out of a flat plane passed therethrough is not objectionable, and, accordingly, the frame members 13 and 21 may be readily omitted without sacrificing any of the other advantageous features of this invention.

Adjacent the lower ends of the side frame members 12—12 a pair of right-angled load supporting or bearing members 25 are welded thereto, which are substantially coextensive in width with the pad members 16, but somewhat more elongated in their horizontal dimension. The forward ends of the bearing members 25 are bent at an angle to the horizontal plane of the bearing member proper and extended approximately to a horizontal plane through the lower marginal end of the side frame members where they terminate in integral hand holds 26. This set of hand holds may be used for conveniently carrying the lower end of the truck up stairways and when lifting the truck on and off automotive trucks or loading docks. Adjacent the inner edges of the hand holds 26 a pair of opposed small caster wheels 27 are rotatably suspended therefrom which support the hand truck 10 in a vertical self-standing position and are adapted for auxiliary rolling of the truck under an article to be carried or when it is necessary to pivot the truck in a vertical position as in going around a stairway landing or advancing the article into a wall recess. From the opposite sides of each of the hand holds 26 a pair of elongated brace members 28 welded thereto are extended to opposite ends of transverse shoe members 30 welded normally to the lower ends of the side frame members 12. These shoe members 30 have a half-oval rubberized bearing face which contacts the floor when the truck is in a vertical or self-standing position and act as a brake to prevent accidental displacement of the truck until it is tilted slightly forward for rolling movement upon the caster wheels 27; or tilted backward upon the oval brake pads or shoe members 30 as a fulcrum until the truck is supported for rolling movement by the main truck wheels, about to be described.

Intermediate the horizontal surface of the bearing members 25 and shoe members 30, U shaped members 32 are welded out-board to the sides of the frame members 12 and are adapted to rotatably journal a pair of main truck wheels 33 for rolling the truck 10 along a carriageway when grasped either by the hand holds 17, or when in a horizontal position and rolled upon the second set of caster wheels 19 and used as a four-wheeled dollie. The rear face 12a of the frame side members 12 are arranged to be used as skids or runners for the easy sliding on or off of automotive truck tailgates and loading docks; and to prevent any sudden drop from the truckwheels 33 to the truck proper, there is a braced triangular-shaped runner 35 welded to the rear face 12a of the lower portion of the frame side members 12 which extends inside of and almost to the lower periphery of the main truck wheels 33. It will thus be apparent there is only a matter of a fractional part of an inch difference in elevation or drop between the time when the load is carried by the truck wheels 33 and when it is passed to the angled runners 35 and gradually to the runners or skids on the rear faces 12a of the side frame members 12.

The use and operation of this apparatus is believed apparent from the detailed description hereinbefore enumerated but it is important to point out that after the truck is constructed all the outer parts thereof that may come in contact with a finished surface of an article to be carried, or the enclosed area or furniture near which the truck is moved, with the exception of the surface 12a of the frame members 12 and the runners 35, are bonded or have an envelope coating of rubber which may be applied to the metal by a well known process. Consequently the apparatus as viewed in the drawings is sheathed in a rubber coating. Since the truck is extensible both longitudinally and laterally it may be elongated to carry a tall upright refrigerator or widened to accommodate the new flat, broad cabinet-base stove. Furthermore, since the inner edges of the rubber-sheathed bearing pads 16 have a small inwardly extending radius, they are suited for safely cradling a round water heater or cooler.

Figure 6:
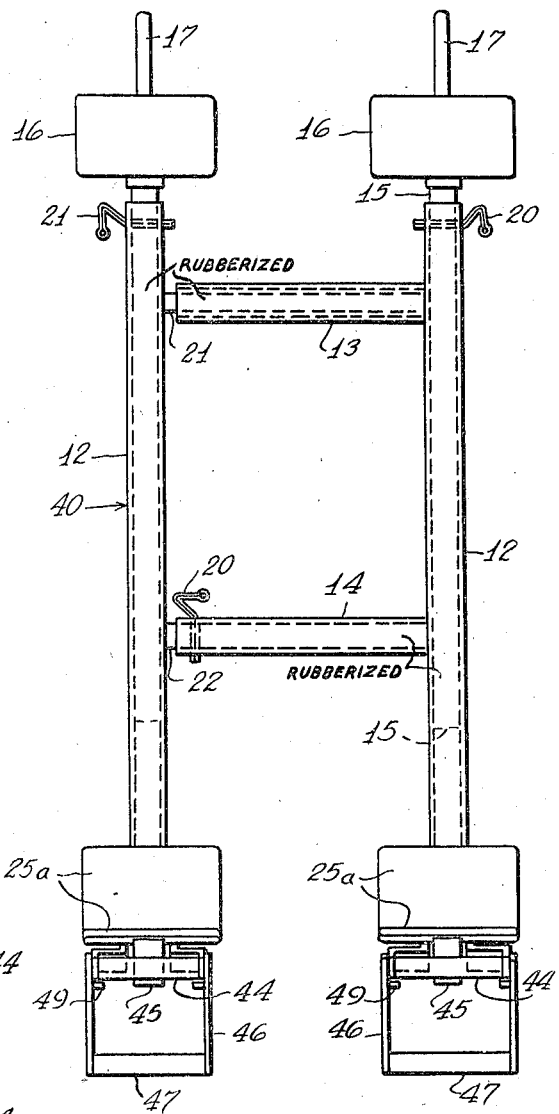
Fig. 6 is a front elevational view of the truck shown in Fig. 5.
Figure 7:
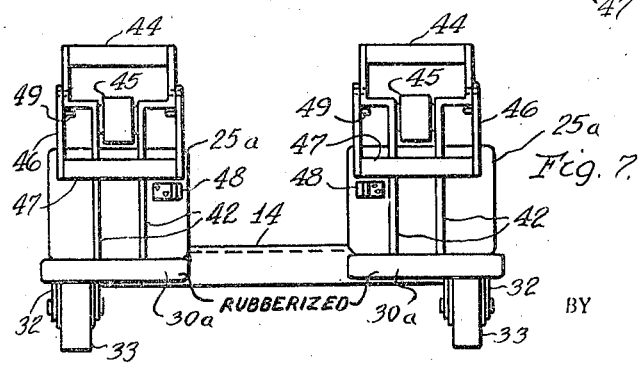
Fig. 7 is a bottom plan view of the hand truck shown in Fig. 5.

In Figs. 5–7 there is shown another form of hand truck very similar to the above described construction, and the corresponding parts have been given like reference characters, only the modified parts and new elements being referred to by reference characters with subscripts or additional characters. In this instance it will be apparent that some of the welded load-supporting toe members of the previously described truck have been eliminated and auxiliary combination pivotal hand holds and rest bars have been substituted to afford more convenient maneuverability to the truck mover in stair wells and the like. The truck generally designated 40, has the same basic frame members as the previously described construction and only the modified parts need be described to give a complete understanding of the invention. Adjacent the lower end of the frame members 12 a pair of load-supporting or toe members 25a are welded thereto. A U shaped shoe member 30a is welded to each of the lower ends of frame members 12 and the outer ends of its arms are extended to and connected with the journals of wheels 33 to brace the members 32. This member 30a has a rubberized bearing face which contacts the floor when the truck is in a generally vertical position and acts as a brake to prevent accidental displacement of the truck, in a manner similar to the shoe 30 of truck 10 previously described.

From the lower or generally horizontal face of each of the toe members 25a a pair of spaced elongated arms 42 terminated in a looped end 44, comprising hand holds, are welded to frame members 12 at substantially a right angle. Between the spaced arms 42 forward of the overlying toe plate 25a, and adjacent the hand-hold loop 44 a pair of small caster wheels 45 are journalled to expedite moving the truck in vertical position in crowded quarters or under an article in a wall recess. These arms 42, hand holds 44 and caster wheels 45, take the place of members 28, 26, and 27, respectively, and previously described. Pivotally attached to opposite sides of the hand holds 44 are a second set of elongated arms 46 also of substantially U shape which provide auxiliary hand holds 47, for a purpose about to be described. The arms 46 are each associated with a friction grip or spring retainer arm 48, dependent from the lower face of toe plate 25 in selected positions, and adapted to fix the auxiliary hand holds 47 out of the way in retracted position until required for use. A set of stops 49 limits forward movement of the arms 42 to a desired angle, convenient for a mover to grasp when standing in a substantially upright position, for a reason to be presently apparent. All of the truck members which may come in contact with the article to be carried are rubber covered for protection thereto, including the several hand holds and the caster wheels, to prevent marring of polished floors over which it may be moved.

The use and operation of the truck 40 as concerns the use of the auxiliary elongated arms and hand holds 47 is as follows: In use of the truck to pick up an article to be carried the arms 46 and hand holds 47 are retracted back out of the way below the arms 42 and above the end of the frame members 12 adjacent the shoe members 30a where they are frictionally held by the spring arms 48. When the article is loaded and tilted back to a rolling angle by means of hand holds 17 the load may be wheeled away on the caster wheels 33. If it is necessary to carry the load up or down a stairway it will be apparent that the relatively short distance the hand holds 26, of Fig. 1 project from the frame members, in relation to the width of the base of the load, which may be carried on the toe plate 25, is relatively small. Accordingly, under these conditions, it is necessary for the mover on the back end of the load to be subjected to unnecessary strain on his arms and back. Now with the pivotal arms 46, and hand holds 47 of Fig. 5 it is only necessary to advance them into operative position and the mover on that end of the load can straighten up and brace his shoulder against the load to relieve himself from the previous awkward and strained position to a position where he can secure a substantial leverage with his back and legs and be relieved of the complete strain of the load on his arm. The removal of caster wheels 27, of Fig. 1, to the central position of wheels 45, as shown in Fig. 5, increases the compactness and maneuverability of the truck as well as reduces the structural members necessary. Other advantageous features and uses in operation are the same as for the description of the previously described truck.

From the foregoing disclosures it will be apparent there has been described a novel portable and extensible hand truck embodying, among other things, the objects and advantages of the invention first enumerated. However, it is not intended to be limited to the specific embodiments herein disclosed, which are for purposes of illustration only and may be varied widely in actual practice through suggestions herefrom to persons skilled in the art to which this invention relates, but regard this invention as commensurate with the spirit and substance of the scope of the following claims.

What I claim is:

1. In a hand truck of the class described, in combination, a frame including a pair of hollow rectangular side members having extensible telescopic sections therein, one or more hollow rectangular transverse frame members having telescopic sections therein connecting said side frame members, load supporting means secured to said side frame members adjacent their lower ends, a pair of wheels rotatably secured to said frame members, the extensible sections telescopically received in the side frame members having a pair of load supporting pads secured thereto including a pair of hand holes depending therefrom, and one of said telescopic transverse frame sections having a reduced section or fit with its enveloping frame member permitting slight longitudinal shifting of said side frame members relative to each other but obviating any twisting movement from a plane passed longitudinally through said frame members.

2. In a hand truck of the class described, in combination, a frame including a pair of side members having telescopic sections therein extensible longitudinally for reception of articles of various length, a transversely extending frame member having a telescopic section therein connecting said side frame members, angular load supporting means adjacent the lower ends of said frame side members, a pair of brace members fixed normally to the lower ends of each of said frame members on the underside of the load supporting means and terminated in a pair of looped handles, a pair of wheels rotatably secured to the side frame members adjacent their lower ends, spaced bearing pads secured to the upper end of each of said extensible telescopic frame sections including handles and caster wheels angularly depending from the opposite face thereof, and a second set of handles having handle arms pivotally secured to said brace members and adapted to extend outward from the horizontal face of the lower load supporting means whereby the truck may be carried by said first named handles and either set of said last named handles.

3. In a hand truck of the class described, in combination, a frame including a pair of side members having telescopic sections therein extensible longitudinally for reception of articles of various length, a transversely extending frame member having a telescopic section therein connecting said side frame members, angular load supporting means adjacent the lower ends of said frame side members, a pair of brace members fixed normally to the lower ends of each of said frame members on the underside of the load supporting means and terminated in a pair of looped handles, a pair of wheels rotatably secured to the side frame members adjacent their lower ends, spaced bearing pads secured to the upper end of each of said extensible telescopic frame sections including handles and caster wheels angularly depending from the opposite face thereof, a second set of handles having handle arms pivotally secured to said brace members and adapted to extend outward from the horizontal face of the lower load supporting means whereby the truck may be carried by said first named handles and either set of said last named handles, and means to retain said pivotal handle arms normally in folded position retracted below the load supporting means and above the lower end of the side frame members.

4. In a hand truck of the class described, in combination, a frame including a pair of side members having telescopic sections therein extensible longitudinally for reception of articles of various length, a transversely extending frame member having a telescopic section therein connecting said side frame members, angular load supporting means adjacent the lower ends of said frame side members, a pair of brace members fixed normally to the lower ends of each of said frame members on the underside of the load supporting means and terminated in a pair of looped handles, a pair of wheels rotatably secured to the side frame members adjacent their lower ends, spaced bearing pads secured to the upper end of each of said extensible telescopic frame sections including handles and caster wheels angularly depending from the opposite face thereof, a second set of handles having handle arms pivotally secured to said brace members and adapted to extend outward from the horizontal face of the lower load supporting means whereby the truck may be carried by said first named handles and either set of said last named handles, means to retain said pivotal handle arms normally in folded position retracted below the load supporting means and above the lower end of the side frame members, and a combination stop means on said pivotal handle arms for limiting outward movement thereof so as to provide a truck rest or fix the angular relation thereof with respect to the truck when in load carrying position.

JOSEPH C. CHENETTE.